(12) United States Patent
Taylor et al.

(10) Patent No.: US 9,492,780 B2
(45) Date of Patent: Nov. 15, 2016

(54) GAS TURBINE INLET GAS PHASE CONTAMINANT REMOVAL

(71) Applicant: BHA Altair, LLC, Franklin, TN (US)

(72) Inventors: Robert Warren Taylor, Ponte Vedra Beach, FL (US); Stephen David Hiner, Wiltshire (GB); Paul Sherwood Bryant, Wiltshire (GB); Vishal Bansal, Overland Park, KS (US)

(73) Assignee: BHA Altair, LLC, Franklin, TN (US)

( * ) Notice: Subject to any disclaimer, the term of this patent is extended or adjusted under 35 U.S.C. 154(b) by 0 days.

(21) Appl. No.: 14/156,504

(22) Filed: Jan. 16, 2014

(65) Prior Publication Data

US 2015/0196868 A1    Jul. 16, 2015

(51) Int. Cl.
*B01D 53/02* (2006.01)
*B01D 53/04* (2006.01)

(52) U.S. Cl.
CPC . *B01D 53/0438* (2013.01); *B01D 2259/40096* (2013.01)

(58) Field of Classification Search
CPC ....................................................... F02C 7/05
See application file for complete search history.

(56) References Cited

U.S. PATENT DOCUMENTS

| 3,168,999 | A |   | 2/1965  | Warren et al. |
| 3,483,750 | A |   | 12/1969 | Pratt |
| 3,612,598 | A |   | 10/1971 | Keslin et al. |
| 3,884,036 | A |   | 5/1975  | Pfenninger |
| 3,910,716 | A |   | 10/1975 | Roughgarden et al. |
| 3,973,931 | A | * | 8/1976  | Collins ............................ 95/99 |
| 3,996,335 | A | * | 12/1976 | Wolk et al. ................. 423/210.5 |
| 4,028,884 | A |   | 6/1977  | Martz et al. |
| 4,674,275 | A |   | 6/1987  | Stroem |
| 4,806,136 | A | * | 2/1989  | Kiersz et al. ................... 62/646 |
| 4,926,620 | A |   | 5/1990  | Donle |
| 5,203,161 | A |   | 4/1993  | Lehto |
| 5,496,012 | A |   | 3/1996  | Kenny, III |
| 5,537,813 | A |   | 7/1996  | Davis et al. |
| 5,560,195 | A |   | 10/1996 | Anderson et al. |
| 5,697,207 | A |   | 12/1997 | Cromer et al. |
| 5,771,868 | A |   | 6/1998  | Khair |
| 5,824,273 | A | * | 10/1998 | Tatani et al. .................. 422/171 |
| 5,927,063 | A |   | 7/1999  | Janda et al. |
| 6,058,695 | A |   | 5/2000  | Ranasinghe et al. |
| 6,079,211 | A |   | 6/2000  | Woollenweber et al. |

(Continued)

FOREIGN PATENT DOCUMENTS

EP        0 350 272 A1    1/1990
EP        0 605 159 A1    7/1994

(Continued)

*Primary Examiner* — Christopher P Jones
(74) *Attorney, Agent, or Firm* — Reinhart Boerner Van Deuren P.C.

(57) ABSTRACT

A sorption arrangement for a gas turbine includes a sorbent-laden media. The sorbent-laden media is positioned within an inlet system for the gas turbine. The sorbent-laden media includes one or more sorbents. The sorbent-laden media contacts inlet air passing through the inlet system for the gas turbine such that gas phase contaminants are removed from the inlet air by the sorbent-laden media. A method of removing gas phase contaminants within an inlet system of a gas turbine is provided.

16 Claims, 7 Drawing Sheets

(56) References Cited

U.S. PATENT DOCUMENTS

| | | |
|---|---|---|
| 6,250,064 B1 | 6/2001 | Tomlinson et al. |
| 6,308,512 B1 | 10/2001 | Kopko |
| 6,318,089 B1 | 11/2001 | Hiraga et al. |
| 6,530,224 B1 | 3/2003 | Conchieri |
| 6,634,165 B2 | 10/2003 | Tomlinson et al. |
| 6,696,774 B1 | 2/2004 | Schneider et al. |
| 6,718,771 B1 | 4/2004 | Kopko |
| 6,769,258 B2 | 8/2004 | Pierson |
| 6,880,343 B2 | 4/2005 | Kopko |
| 6,901,348 B2 | 5/2005 | Smith et al. |
| 6,938,405 B2 | 9/2005 | Carberg et al. |
| 6,952,639 B2 | 10/2005 | Kumar et al. |
| 6,959,552 B2 | 11/2005 | Leblanc |
| 7,150,778 B1 | 12/2006 | Dauber et al. |
| 7,185,498 B1 | 3/2007 | Jonsson |
| 7,343,746 B2 | 3/2008 | Pierson |
| 7,527,674 B1 | 5/2009 | Janawitz et al. |
| 7,585,343 B2 | 9/2009 | Clements |
| 7,634,385 B2 | 12/2009 | Smith |
| 7,644,573 B2 | 1/2010 | Smith et al. |
| 7,648,564 B2 | 1/2010 | Chillar et al. |
| 7,695,551 B2 | 4/2010 | Janawitz et al. |
| 7,707,814 B2 | 5/2010 | Sonoda et al. |
| 8,001,787 B2 | 8/2011 | Sutcu et al. |
| 8,038,776 B2 | 10/2011 | Janawitz et al. |
| 8,114,196 B2 | 2/2012 | Lamee |
| 8,262,780 B2 | 9/2012 | Smithies et al. |
| 8,337,597 B2 | 12/2012 | Chillar et al. |
| 8,372,181 B2 | 2/2013 | Davies |
| RE44,079 E | 3/2013 | Pierson |
| 8,440,002 B2 | 5/2013 | Jarrier et al. |
| 8,475,115 B2 | 7/2013 | Zhang et al. |
| 2002/0056994 A1 | 5/2002 | Irish |
| 2002/0083712 A1 | 7/2002 | Tomlinson et al. |
| 2002/0152891 A1* | 10/2002 | Massimo et al. ............... 95/96 |
| 2003/0106319 A1 | 6/2003 | Kopko |
| 2004/0011046 A1 | 1/2004 | Pierson |
| 2004/0031450 A1* | 2/2004 | Chandran et al. ............... 122/24 |
| 2004/0093147 A1 | 5/2004 | Kumar et al. |
| 2004/0243350 A1 | 12/2004 | Smith et al. |
| 2005/0056023 A1 | 3/2005 | Pierson |
| 2005/0102995 A1 | 5/2005 | Carberg et al. |
| 2005/0182576 A1 | 8/2005 | Smith |
| 2005/0204743 A1 | 9/2005 | Leblanc |
| 2007/0039331 A1 | 2/2007 | Jonsson |
| 2007/0051109 A1 | 3/2007 | Sonoda et al. |
| 2007/0240400 A1 | 10/2007 | Smith et al. |
| 2007/0294984 A1 | 12/2007 | Chillar et al. |
| 2008/0022856 A1 | 1/2008 | Clements |
| 2008/0202124 A1 | 8/2008 | Sutcu et al. |
| 2009/0071114 A1 | 3/2009 | Smithies et al. |
| 2009/0150040 A1 | 6/2009 | Rofka et al. |
| 2009/0229468 A1 | 9/2009 | Janawitz et al. |
| 2009/0252598 A1 | 10/2009 | Snider et al. |
| 2009/0320678 A1 | 12/2009 | Chang et al. |
| 2010/0054926 A1 | 3/2010 | Zhang et al. |
| 2010/0175389 A1 | 7/2010 | Janawitz et al. |
| 2010/0205967 A1 | 8/2010 | Gopalkrishna et al. |
| 2010/0300975 A1 | 12/2010 | Pate |
| 2010/0319384 A1 | 12/2010 | Zhang et al. |
| 2011/0016838 A1 | 1/2011 | Smithies et al. |
| 2011/0048236 A1 | 3/2011 | Lamee |
| 2011/0052377 A1 | 3/2011 | Chamoto et al. |
| 2011/0132032 A1* | 6/2011 | Gatti et al. ............... 62/615 |
| 2011/0173947 A1 | 7/2011 | Zhang et al. |
| 2011/0192171 A1 | 8/2011 | Sutcu et al. |
| 2011/0198055 A1* | 8/2011 | Meirav et al. ............... 165/59 |
| 2011/0206573 A1* | 8/2011 | Ackley et al. ............... 422/218 |
| 2011/0289898 A1 | 12/2011 | Hellat et al. |
| 2011/0289899 A1 | 12/2011 | De La Cruz Garcia et al. |
| 2011/0290116 A1 | 12/2011 | Jarrier et al. |
| 2011/0299973 A1 | 12/2011 | Zhang et al. |
| 2012/0005997 A1 | 1/2012 | Davies |
| 2012/0199001 A1 | 8/2012 | Chillar et al. |
| 2012/0247114 A1 | 10/2012 | Pierson et al. |
| 2012/0269613 A1 | 10/2012 | Mills et al. |
| 2013/0000321 A1 | 1/2013 | Arar et al. |
| 2013/0011244 A1 | 1/2013 | Hao et al. |
| 2013/0051994 A1 | 2/2013 | Lafontaine et al. |
| 2013/0067922 A1 | 3/2013 | Zhang et al. |
| 2013/0087219 A1 | 4/2013 | Rajesh et al. |
| 2013/0168180 A1 | 7/2013 | Merchant et al. |
| 2013/0199202 A1 | 8/2013 | Zhang et al. |
| 2013/0298774 A1 | 11/2013 | Ding et al. |
| 2014/0137780 A1* | 5/2014 | Boulet ............... 110/345 |
| 2015/0078964 A1* | 3/2015 | Meirav ............... B01D 53/0407 422/120 |

FOREIGN PATENT DOCUMENTS

| | | |
|---|---|---|
| EP | 0 651 145 B1 | 5/1995 |
| EP | 0 648 919 B1 | 12/1998 |
| EP | 0 952 316 B1 | 10/1999 |
| EP | 1 005 605 B1 | 6/2000 |
| EP | 1 225 306 B1 | 7/2002 |
| EP | 1 245 805 A2 | 10/2002 |
| EP | 1 407 119 B1 | 1/2005 |
| EP | 1 744 014 A1 | 1/2007 |
| EP | 1 760 292 A2 | 3/2007 |
| EP | 1 762 715 A2 | 3/2007 |
| EP | 1 882 510 A1 | 1/2008 |
| EP | 2 126 289 | 9/2008 |
| EP | 2 198 945 A2 | 6/2010 |
| EP | 2 368 022 | 7/2010 |
| EP | 2 248 999 A1 | 11/2010 |
| EP | 2 369 145 A1 | 9/2011 |
| EP | 2 392 394 A1 | 12/2011 |
| EP | 2 514 927 A2 | 10/2012 |
| EP | 2 541 022 A2 | 1/2013 |
| EP | 2 570 631 A2 | 3/2013 |
| EP | 2 573 365 A2 | 3/2013 |
| EP | 2 613 036 A2 | 7/2013 |
| EP | 2 626 535 A2 | 8/2013 |
| EP | 1 733 127 B1 | 4/2014 |
| WO | WO 90/00436 A1 | 1/1990 |
| WO | WO 96/36799 A1 | 11/1996 |
| WO | WO 99/09301 A1 | 2/1999 |
| WO | WO 99/09309 A1 | 2/1999 |
| WO | WO 01/18372 A1 | 3/2001 |
| WO | WO 03/002851 A1 | 1/2003 |
| WO | WO 03/089770 A1 | 10/2003 |
| WO | WO 2004/044386 A2 | 5/2004 |
| WO | WO 2005/088104 A1 | 9/2005 |
| WO | WO 2008/105862 A1 | 9/2008 |
| WO | WO 2010/072710 A2 | 7/2010 |
| WO | WO 2011/110554 A1 | 9/2011 |
| WO | WO 2012/012912 A1 | 2/2012 |
| WO | 2013/155159 A1 | 10/2013 |

* cited by examiner

GAS TURBINE INLET GAS PHASE CONTAMINANT REMOVAL

BACKGROUND OF THE INVENTION

1. Field of the Invention

The present invention relates generally to an inlet system for a gas turbine and, in particular, to sorption arrangement for removing gas phase contaminants from air flow within the inlet system.

2. Discussion of the Prior Art

Inlet systems for gas turbines are generally used for treating fluid (e.g., air) that passes to the gas turbine. The fluid can be treated by filtering the fluid with one or more filter elements extending within the inlet system. In the past, the filter elements removed particulates and/or liquid mist. However, gas phase contaminants passed through the filter media of the filter elements and traveled to the compressor section of the gas turbine. These gas phase contaminants caused a number of problems in the gas turbine including, but not limited to, degradation of performance of the gas turbine, corrosion of gas turbine blades, etc. Accordingly, there is a need, and it would be beneficial, to provide an inlet system for a gas turbine that removes gas phase contaminants.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a sorption arrangement for a gas turbine. The sorption arrangement includes a sorbent-laden media positioned within an inlet system for the gas turbine. The sorbent-laden media includes one or more sorbents. The sorbent-laden media contacts inlet air passing through the inlet system for the gas turbine such that gas phase contaminants are removed from the inlet air by the sorbent-laden media.

In accordance with another aspect, the present invention provides a sorption arrangement for a gas turbine. The sorption arrangement includes a support structure positioned within an inlet system for the gas turbine. The sorption arrangement includes a heating device attached with respect to the support structure and configured to heat the support structure. The sorption arrangement includes a sorbent-laden media supported by the support structure. The sorbent-laden media includes one or more sorbents. The sorbent-laden media contacts inlet air passing through the inlet system for the gas turbine such that gas phase contaminants are removed from the inlet air by the sorbent-laden media.

In accordance with another aspect, the present invention provides a method of removing gas phase contaminants within an inlet system of a gas turbine. The method includes providing a sorbent-laden media including one or more sorbents within the inlet system for the gas turbine. The method includes passing inlet air by the sorbent-laden media. The method includes removing gas phase contaminants from the inlet air with the sorbent-laden media. The method includes heating the sorbent-laden media to extract the gas phase contaminants from the sorbent-laden media.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
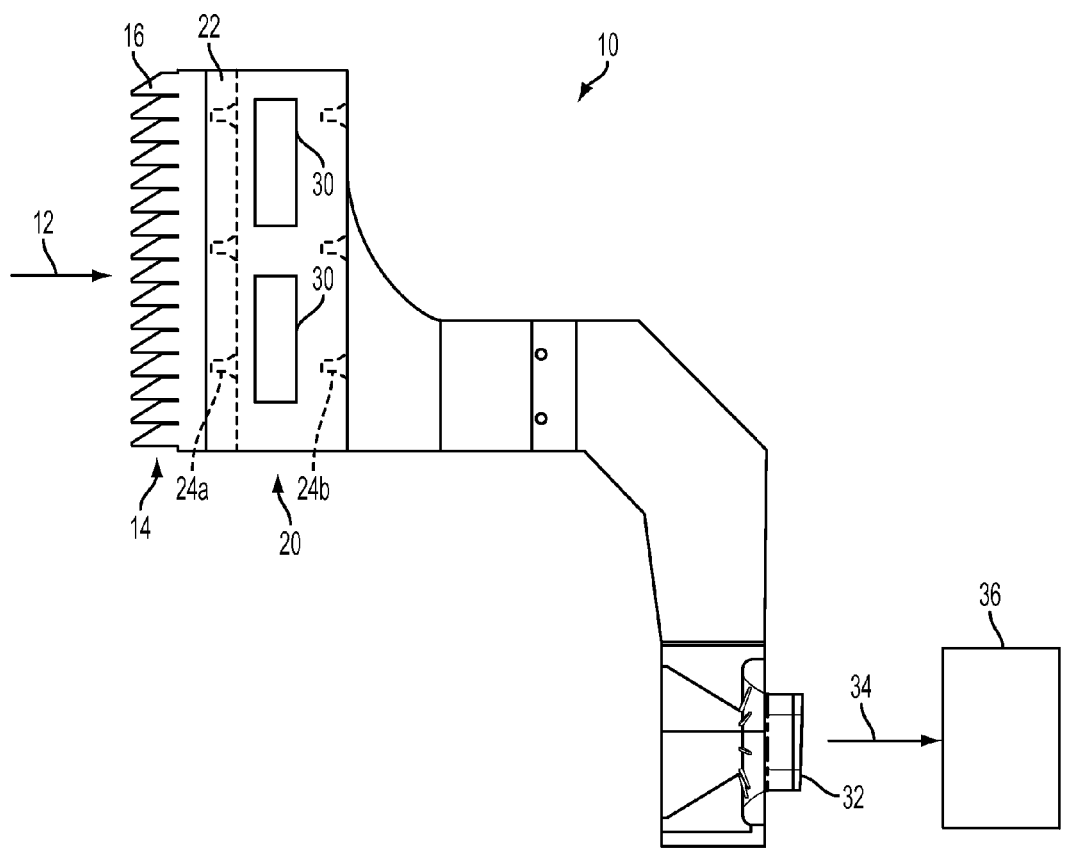
FIG. 1 is generic/schematic illustration of an example inlet system for a gas turbine in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 schematically illustrates an example inlet system 10 for delivering a fluid (e.g., inlet air 12) to a device, such as a gas turbine, according to one aspect of the invention. The inlet system 10 can include an inlet section 14. It should be appreciated that the inlet section 14 is somewhat generically shown within FIG. 1. This generic representation is intended to convey the concept that the inlet section 14 of the inlet system 10 shown in FIG. 1 can represent a known construction or a construction in accordance with one or more aspects of the present invention as will be described below. The inlet section 14 can be positioned at an upstream location of the inlet system 10. The inlet section 14 can define an open area through which the inlet air 12 can enter the inlet system 10.

The inlet section 14 can include one or more hoods 16. The hoods 16 can provide a shielding function to help protect the inlet system 10 from ingesting at least some materials and/or precipitation that may otherwise enter the inlet section 14. Examples of such materials that the hoods 16 can shield from ingestion can include, but are not limited to, rain, snow, leaves, branches, animals, dust, particulates, etc. The hoods 16 are not limited to the shown example, and can take on a number of different sizes, shapes, and configurations. Moreover, the hoods 16 can be designed to withstand some amount of impact force from the materials and/or precipitation.

The example inlet system 10 can further include a filter section 20 positioned adjacent, and downstream from, the inlet section 14. The filter section 20 can be in fluid communication with the inlet section 14, such that the filter section 20 can receive the inlet air 12 from the inlet section 14. The filter section 20 defines a chamber 22 that includes a substantially open area. The chamber 22 can be substantially hollow such that the inlet air 12 can enter and flow through the chamber 22.

The filter section 20 can include one or more air filters 24a, 24b positioned within the chamber 22. The inlet air 12 can be filtered by the air filters 24a, 24b as the inlet air 12 passes through the filter section 20. It is to be appreciated that the air filters 24a, 24b are illustrated with dashed-lines, as the air filters 24a, 24b can be positioned at any number of locations within the filter section 20. For example, the air filters 24a, 24b can be positioned at an upstream location (e.g., illustrated with air filters 24a) and/or at a downstream location (e.g., illustrated with air filters 24b). Indeed, the position and the number of air filters 24a, 24b illustrated in FIG. 1 are not intended to be limiting, as any number of positions and/or total number of air filters 24a, 24b are envisioned.

The filter section 20 can further include one or more sorption arrangements 30 positioned within the chamber 22. It is to be appreciated that the sorption arrangements 30 are illustrated generically/schematically for ease of illustration and to more clearly show an example location of the sorption arrangements 30 within the filter section 20. The sorption arrangements 30 are not limited to the illustrated locations within the filter section 20, and, in other examples, can be located at nearly any location within the inlet system 10, including upstream and/or downstream from the filter section 20. In some examples, the sorption arrangements 30 are located upstream from the air filters 24b. In other examples, the sorption arrangements 30 are located downstream from the air filters 24a. It is to be understood that the sorption arrangements 30 are somewhat generically shown, and that the inlet system 10 could include a greater or fewer number of sorption arrangements than in the shown example.

The inlet air 12 can pass (e.g., in contact with) the sorption arrangements 30, with gas phase contaminants being at least partially adsorbed/removed from the inlet air 12. After exiting the filter section 20, the inlet air 12 can pass through an outlet 32 prior to exiting the inlet system 10 as exiting air flow 34. The exiting air flow 34 can then enter a gas turbine 36 (illustrated generically/schematically in FIG. 1).

Figure 2:
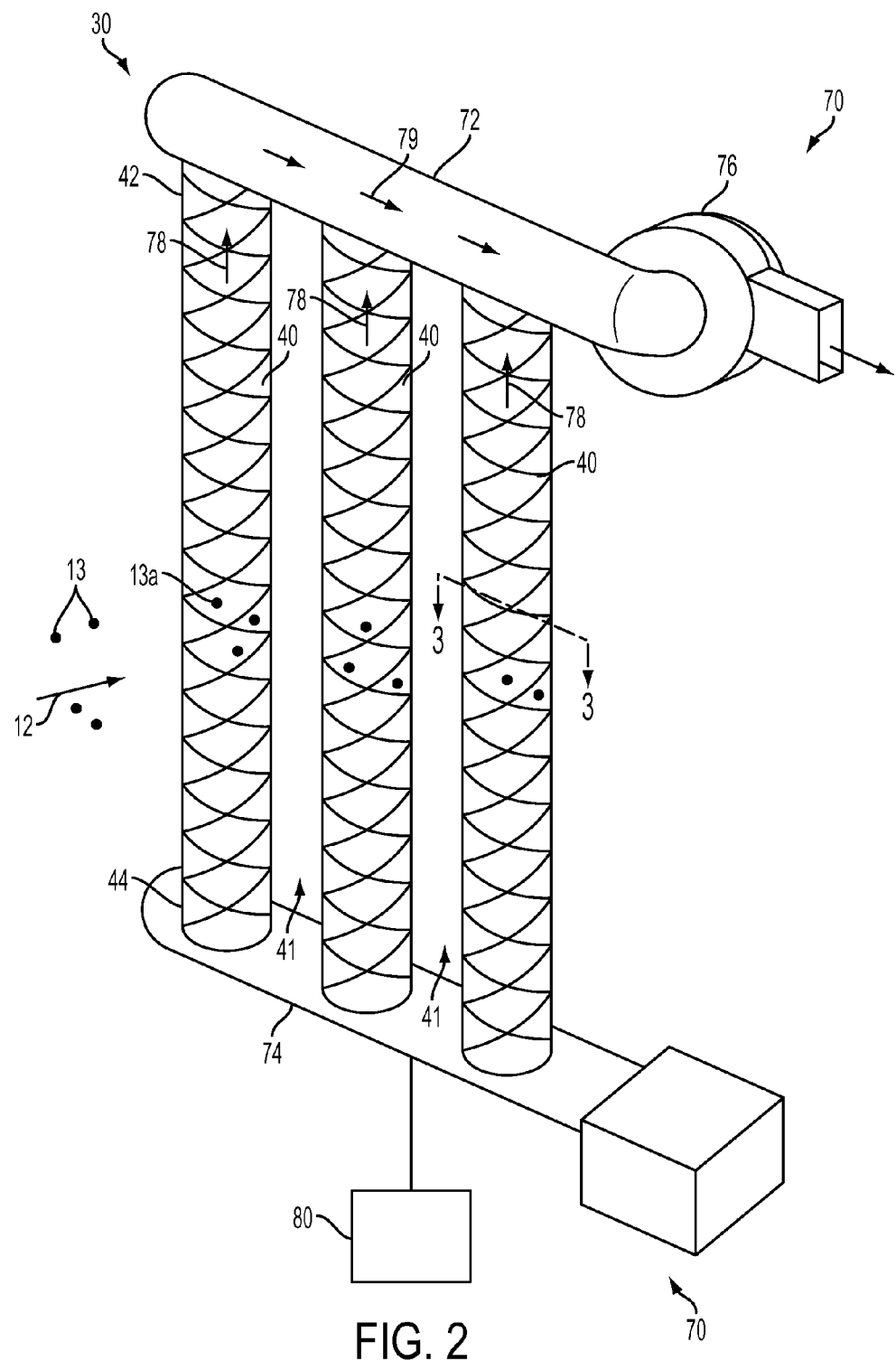
FIG. 2 is a perspective view of an example sorption arrangement including sorbent-laden structures for use in the inlet system of FIG. 1.

Turning to FIG. 2, an example of the sorption arrangement 30 is illustrated. It will be appreciated that the sorption arrangement 30 includes only one of any number of possible designs, constructions, etc. The sorption arrangement 30 (e.g., one or more sorption arrangements 30) of FIG. 2 can be positioned within the filter section 20 of the inlet system 10 for the gas turbine 36.

The sorption arrangement 30 can include one or more sorbent-laden structures 40. In the illustrated example, the sorption arrangement 30 includes three sorbent-laden structures 40 that extend generally parallel to each other, though, in other examples, any number of sorbent-laden structures 40 are envisioned. The sorbent-laden structures 40 can be spaced apart to define an opening 41 (e.g., gap, space, or the like) extending between adjacent sorbent-laden structures 40. The sorbent-laden structures 40 include any number of geometries. In some examples, the sorbent-laden structures 40 are each elongated, generally cylindrically shaped structures that extend linearly between a first end 42 and an opposing second end 44. The sorbent-laden structures 40 are not limited to this geometry/shape, and in other examples, may extend non-linearly, such as by including one or more bends, undulations, angles, etc. Likewise, the sorbent-laden structures 40 are not limited to including the generally cylindrical shape, and, in other examples, may include polygonal shapes, quadrilateral shapes (e.g., rectangular, circular, etc.), ovoid shapes, or the like.

Figure 3:
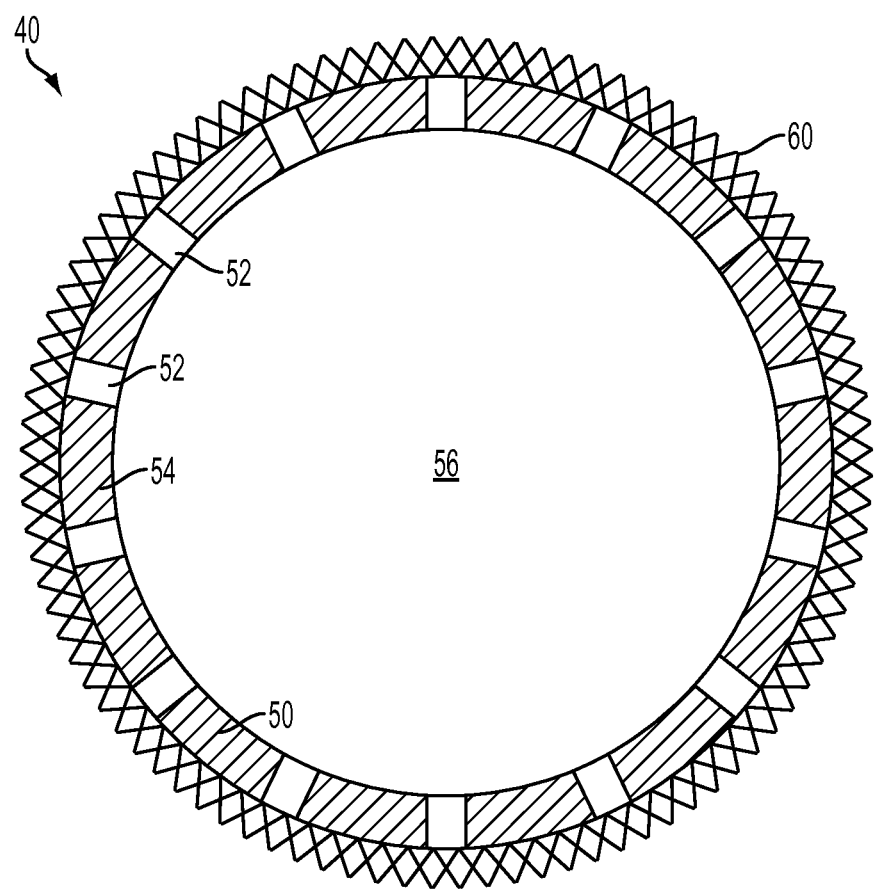
FIG. 3 is a sectional view of one of the sorbent-laden structures taken along lines 3-3 of FIG. 2.

Referring now to FIGS. 2 and 3, FIG. 3 illustrates a sectional view of one of the sorbent-laden structures 40 along line 3-3 of FIG. 2. It will be appreciated that while a cross-section of only one of the sorbent-laden structures 40 is illustrated, the other sorbent-laden structures 40 may be substantially identical in size, shape, and construction.

The sorbent-laden structures 40 can include a support structure 50. The support structure 50, as part of the sorption arrangement 30, is positioned within the inlet system 10 for the gas turbine 36. In some examples, the support structure 50 is at least partially porous, such as by comprising a mesh-like material, for example. The porosity of the support structure 50 is illustrated generically/schematically in FIG. 3 with one or more openings 52 extending through the support structure 50. In operation, however, the pores in the support structure 50 may be smaller and/or more abundant than the generically/schematically illustrated openings 52. In general, by having at least some degree of porosity, the support structure 50 can allow for fluid flow, air flow, particulate flow, or the like through the openings 52 in the support structure 50.

In this example, the support structure 50 includes a support wall 54 that defines a substantially hollow interior 56. The hollow interior 56 of the support structure 50 can extend along the length of the support structure 50 (e.g., between the first end 42 and the second end 44). The support wall 54 includes any number of materials, including, but not limited to, metal materials (e.g., steel, etc.), plastic materials (e.g., sintered plastic), fibrous materials, materials with high-temperature polymers, etc. In some examples, the support structure 50 is relatively rigid and self-supporting, so as to support one or more materials on the support structure 50. In other examples, the support structure 50 is flexible and allows for at least some degree of movement, flexion, and/or elasticity.

The sorbent-laden structure 40 can include a sorbent-laden media 60. The sorbent-laden media 60, as part of the sorption arrangement 30, is positioned within the inlet system 10 for the gas turbine 36. In some examples, the sorbent-laden media 60 is supported by the support structure 50, such that the sorbent-laden media 60 is supported by the support wall 54. The sorbent-laden media 60 can be supported on a side of the support wall 54 that is radially opposite the hollow interior 56. As such, in some examples, the openings 52 can extend through the support structure 50 between the hollow interior 56 on one side and the sorbent-laden media 60 on an opposing second side. The sorbent-laden media 60 can be applied to the support wall 54 in any number of ways, such as by impregnating a media/fabric with sorbents (e.g., by sputtering, deposition, etc.).

It is to be appreciated that the sorbent-laden media 60 is illustrated generically/schematically in FIG. 3, as the sorbent-laden media 60 includes any number of constructions. For example, the sorbent-laden media 60 includes sorbents that at least partially cover the support structure 50. In some examples, the sorbent-laden media 60 can be attached to the support structure 50 in any number of ways, such as by deposition, coating, impregnating, sputtering, or the like.

The sorbent-laden media 60 includes one or more sorbents that are capable of adsorbing targeted liquids and/or gases. The sorbent-laden media 60 includes sorbents such as carbon, for example. In some examples, the sorbent-laden structures 40 can each include the same sorbent-laden media 60 (e.g., carbon, for example) such that the same type of gas phase contaminants (e.g., gas phase contaminants 13 illustrated generically/schematically in FIG. 2) can be removed from the inlet air 12. In other possible examples, however, the sorption arrangement 30 can include multiple sorbent-laden structures 40, with different sorbent-laden structures 40 including a different sorbent-laden media 60. In such an example, the sorption arrangement 30 can remove a plurality of different types of gas phase contaminants 13 from the inlet air 12, depending on the type of sorbents comprising the sorbent-laden media 60. In operation, the sorbent-laden media 60 can contact the inlet air 12 that passes through the inlet system 10 for the gas turbine 36, such that the gas phase contaminants 13 are removed from the inlet air 12 by the sorbent-laden media 60.

Referring to FIG. 2, the sorption arrangement 30 can include a manifold 70. In some examples, the manifold 70 can support the sorbent-laden structures 40, including the support structures 50, the sorbent-laden media 60, etc. The manifold 70 can include a first manifold structure 72 and a second manifold structure 74.

The first manifold structure 72 is attached with respect to the first end 42 of the sorbent-laden structures 40. In one possible example, the first manifold structure 72 is attached to the support structures 50, such as by welding, adhesives, mechanical locking structures, or the like. The first manifold structure 72 can have a length that extends across each of the support structures 50 of the sorbent-laden structures 40 (e.g., three in this example). In an example, the first manifold structure 72 is generally hollow and extends generally linearly in a direction that is substantially perpendicular to a direction along which the sorbent-laden structures 40 extend. The first manifold structure 72 is not so limited, however, and in other examples, may extend along a non-linear axis, such as by including one or more bends, undulations, angles, etc. By being generally hollow, the first manifold structure 72 can be in fluid communication with the hollow interior 56 of the sorbent-laden structures 40, such that air can flow between the interiors of the first manifold structure 72 and the sorbent-laden structures 40.

The second manifold structure 74 is attached with respect to the second end 44 of the sorbent-laden structures 40. In one possible example, the second manifold structure 74 is attached to the support structures 50, such as by welding, adhesives, mechanical locking structures, or the like. The second manifold structure 74 can have a length that extends across the support structures 50 of the sorbent-laden structures 40 (e.g., three in this example). In an example, the second manifold structure 74 is generally hollow and extends generally linearly in a direction that is substantially perpendicular to a direction along which the sorbent-laden structures 40 extend. The second manifold structure 74 is not so limited, however, and in other examples, may extend along a non-linear axis, such as by including one or more bends, undulations, angles, etc. The second manifold structure 74 can be generally similar or identical to the first manifold structure 72, but for being located at the second end 44 of the sorbent-laden structures 40. By being generally hollow, the second manifold structure 74 can be in fluid communication with the hollow interior 56 of the sorbent-laden structures 40, such that air can flow between the interiors of the second manifold structure 74 and the sorbent-laden structures 40.

The sorption arrangement 30 can include a blower 76. In the illustrated example, the blower 76 can be attached with respect to the first manifold structure 72, though, in other examples, the blower 76 can be attached with respect to the second manifold structure 74. The blower 76 is illustrated somewhat generically/schematically, as it will be appreciated that the blower 76 includes any number of air propelling structures, such as fans, air movers, negative pressure machines, etc. The blower 76 is in fluid communication with the hollow interior of the first manifold structure 72, such that the blower 76 can move air from the hollow interior 56 of the sorbent-laden structures 40 through the hollow interior of the first manifold structure 72 and towards the blower 76. As such, in this example, the blower 76 is attached with respect to the hollow interior 56 of the support structure 50 (e.g., through the first manifold structure 72).

In operation, the blower 76 can move air and create a negative pressure within the hollow interior 56 of the sorbent-laden structures 40. In one possible example, the blower 76 can draw air from the hollow interior 56 of the sorbent-laden structures 40 and through the first manifold structure 72. It will be appreciated that the air flow 78 through the sorbent-laden structures 40 and the air flow 79 through the first manifold structure 72 is illustrated generically/schematically in FIG. 2 with arrowheads. Due to the support structure 50 being porous or semi-porous (e.g., through the openings 52), air can be drawn through the sorbent-laden media 60, through the openings 52 in the support structure 50, and through the hollow interior 56.

The sorption arrangement 30 can include a heating device 80. The heating device 80 is illustrated generically/schematically as it is to be appreciated that the heating device 80 includes any number of designs, configurations, etc. In one possible example, the heating device 80 can be attached with respect to the support structure 50 through one of the manifold structures (e.g., first manifold structure 72 or second manifold structure 74). In this example, the heating device 80 can include an electrical device that passes electric current to the support structure 50, such as through one of the manifold structures (e.g., first manifold structure 72 or second manifold structure 74). As such, the passage of the electric current through the electrically conductive support structure 50 can release heat, thus causing the sorbent-laden media 60 to heat as well. In this example, the heating device 80 can heat the support structure 50 by Joule heating, though other means of heating are envisioned.

The heating device 80 is not limited to including the aforementioned electrical device. Rather, in other examples, the heating device 80 includes any number of devices that can cause the support structure 50 and, thus, the sorbent-laden media 60 to heat up. For example, the heating device 80 may comprise a source of warm or high temperature air, such that the heating device 80 delivers this high temperature air through the hollow interior 56 of the support structure 50. As such, the support structure 50 and, thus, the sorbent-laden media 60, can be heated by thermal conduction due to the high temperature air from the heating device 80. In at least one example, the source of the high temperature air may include the gas turbine 36, such that the high temperature air (e.g., bleed heat from the gas turbine 36) is delivered from the gas turbine 36 to the sorption arrangement 30.

Referring to FIGS. 2 and 3, the operation of the sorption arrangement 30 can be described. The sorption arrangement 30 can be positioned within the inlet system 10 either upstream or downstream from the filters 24. In either example, the sorption arrangement 30 is positioned within the flow path of the inlet air 12. The filters 24 can filter/remove any number of materials and/or contaminants from the inlet air 12, including solid particulates, liquid particulates, or the like.

In some examples, the inlet air 12 includes gas phase contaminants 13 (illustrated generically/schematically in FIG. 2) that may not be adequately removed by the filters 24. These gas phase contaminants 13 may include, for example, sulfur compounds, fluoride compounds, chloride compounds, or other gas phase contaminants that may cause performance degradation and/or corrosion of the gas turbine 36. The sorption arrangement 30 can remove at least some of these gas phase contaminants 13 from the inlet air 12. In particular, as the inlet air 12 flows past the sorbent-laden structures 40 of the sorption arrangement 30, active deposits (e.g., sorbents) of the sorbent-laden media 60 can adsorb at least some of the gas phase contaminants 13 within the inlet air 12. Indeed, as illustrated in FIG. 2, adsorbed contaminants 13a are illustrated generically/schematically on the surface of the sorbent-laden media 60. Accordingly, the inlet air 12 can flow past the sorption arrangement 30 and to the gas turbine 36, with a reduced amount of gas phase contaminants 13 present within the inlet air 12.

After a period of time, a saturation level of gas phase contaminants 13a adsorbed by the sorbent-laden structures 40 may be reached, such that further adsorption of gas phase contaminants 13 by the sorbent-laden structures 40 is reduced. As such, a regeneration process can occur to allow for the sorption arrangement 30 to continue adsorption of the gas phase contaminants 13. During the regeneration process, the blower 76 can move air to create a negative pressure within the hollow interior 56 and within the first manifold structure 72. As such, at least some air is drawn through the openings 52 (e.g., pores) of the support structure 50. During this time, the heating device 80 can pass electric current to the support structure 50, which causes the support structure 50 and, thus, the sorbent-laden media 60 to heat up. Due, at least in part, to this heating, adsorbed contaminants 13a on the sorbent-laden media 60 are released (such as by being drawn into the hollow interior 56 and to the blower 76, for example).

In one possible example, this heating can last approximately 5 to 10 minutes before the sorbent-laden structures 40 are fully regenerated. Once the sorbent-laden structures 40 are regenerated and at least some of the adsorbed contaminants 13a have been removed from the sorbent-laden media 60, the blower 76 and/or the heating device 80 may be turned off, and adsorption of the gas phase contaminants 13 from the inlet air 12 may commence.

Figure 4:
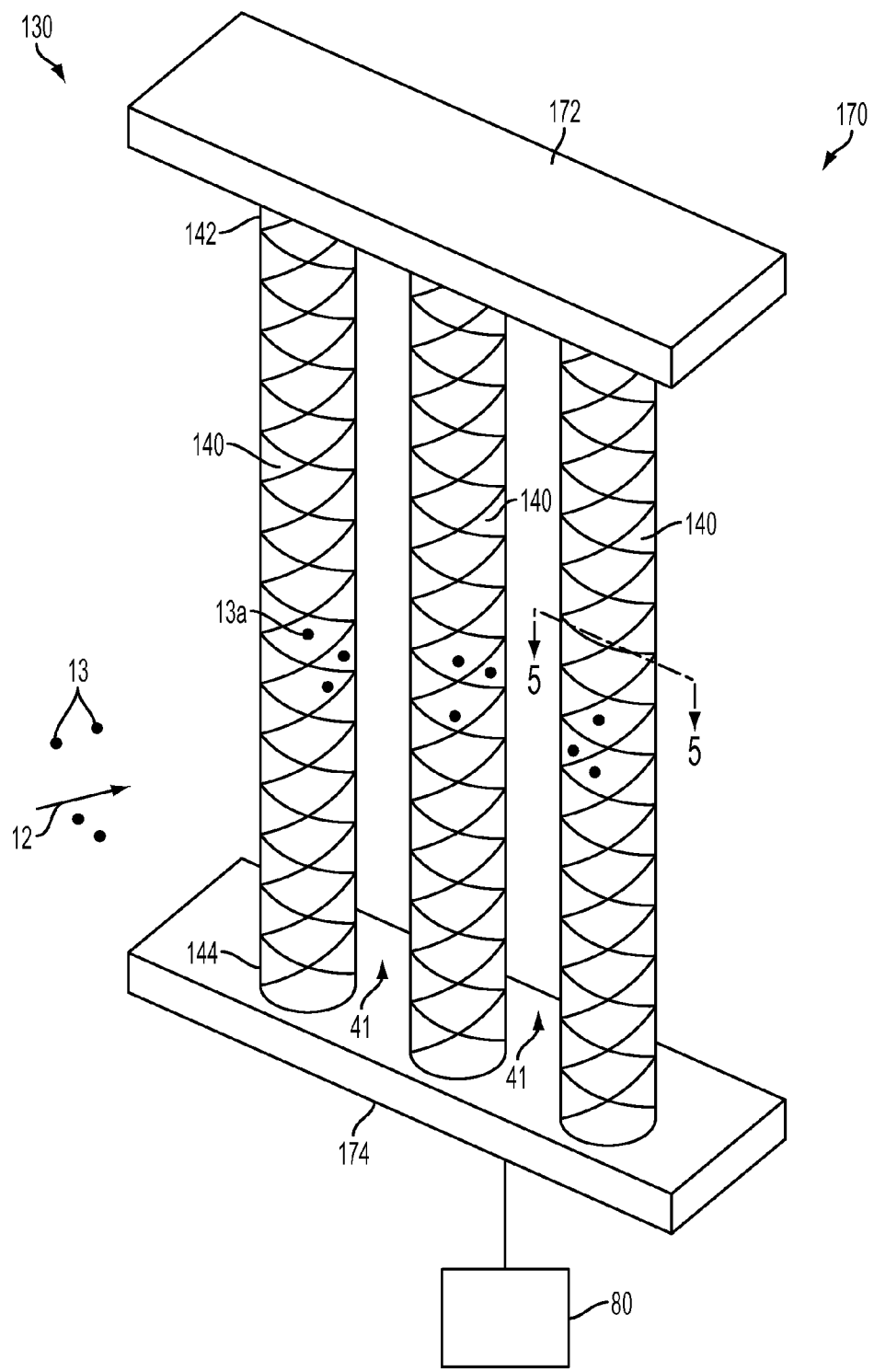
FIG. 4 is a perspective view of a second example sorption arrangement including sorbent-laden structures for use in the inlet system of FIG. 1.

Turning now to FIG. 4, a second example sorption arrangement 130 is illustrated. It will be appreciated that the second sorption arrangement 130 includes only one of any number of possible designs, constructions, etc. The second sorption arrangement 130 of FIG. 4 can be positioned within the filter section 20 of the inlet system 10 for the gas turbine 36.

The second sorption arrangement 130 can include one or more sorbent-laden structures 140. In the illustrated example, the second sorption arrangement 130 includes three sorbent-laden structures 140, though, in other examples, any number of sorbent-laden structures 140 are envisioned. As with the example of FIG. 2, the sorbent-laden structures 140 are spaced apart to define the openings 41 extending between adjacent sorbent-laden structures 140. Likewise, as with the example of FIG. 2, while the sorbent-laden structures 140 are illustrated as being elongated, generally cylindrically shaped structures that extend linearly between a first end 142 and an opposing second end 144, any number of sizes (e.g., longer or shorter), shapes (e.g., polygonal shapes, quadrilateral shapes, rectangular shapes, circular shapes, ovoid shapes, etc.) and/or configurations (e.g., extending non-linearly with one or more bends, undulations, angles, etc.) are envisioned.

Figure 5:
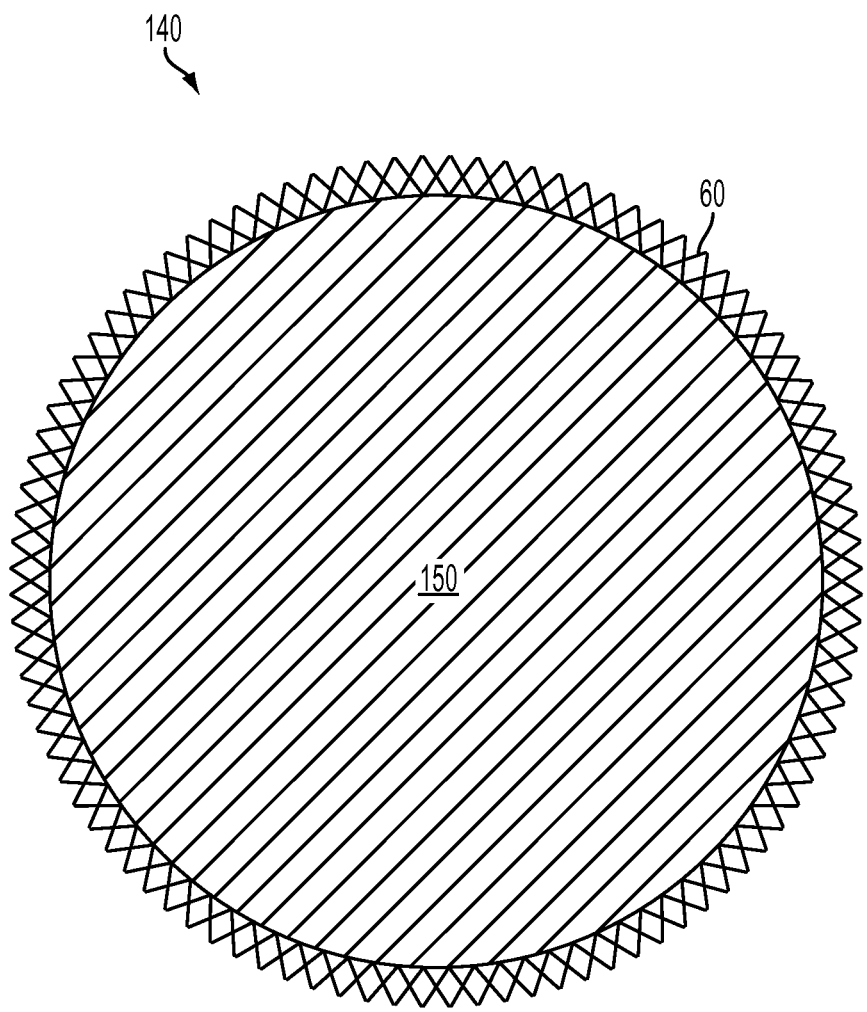
FIG. 5 is a sectional view of one of the sorbent-laden structures taken along lines 5-5 of FIG. 4.

Referring now to FIGS. 4 and 5, FIG. 5 illustrates a sectional view of one of the sorbent-laden structures 140 along line 5-5 of FIG. 4. It will be appreciated that while a cross-section of only one of the sorbent-laden structures 140 is illustrated, the other sorbent-laden structures 140 may be substantially identical in size, shape, and construction.

The sorbent-laden structures 140 can include a support structure 150. The support structure 150, as part of the second sorption arrangement 130, is positioned within the inlet system 10 for the gas turbine 36. While the support structure 150 includes any number of designs/configurations, in this example, the support structure 150 is substantially solid and non-hollow. The support structure 150 includes any number of materials, including, but not limited to, metal materials (e.g., steel, etc.), plastic materials (e.g., sintered plastic), fibrous materials, materials with high-temperature polymers, etc. In some examples, the support structure 150 is relatively rigid and self-supporting, so as to support one or more materials on the support structure 150. In other examples, the support structure 150 is flexible and allows for at least some degree of movement, flexion, and/or elasticity.

The sorbent-laden structures 140 can include the sorbent-laden media 60. The sorbent-laden media 60, as part of the second sorption arrangement 130, is positioned within the inlet system 10 for the gas turbine 36. In this example, the sorbent-laden media 60 is supported by the support structure 150. It is to be appreciated that the sorbent-laden media 60 is generally identical to the sorbent-laden media 60 described above with respect to FIGS. 2 and 3. As such, the sorbent-laden media 60 need not be described in detail again.

Referring to FIG. 4, the second sorption arrangement 130 can include a manifold 170. In some examples, the manifold 170 can support the sorbent-laden structures 140, including the support structures 150 (FIG. 5), the sorbent-laden media 60, etc. The manifold 170 can include a first manifold structure 172 and a second manifold structure 174.

The first manifold structure 172 is attached with respect to the first end 142 of the sorbent-laden structures 140. In one possible example, the first manifold structure 172 is attached to the support structures 150 by welding, adhesives, mechanical locking structures, or the like. The first manifold structure 172 can have a length that extends across each of the support structures 150 of the sorbent-laden structures 140 (e.g., three in this example). In an example, the first manifold structure 172 is generally solid and extends generally linearly in a direction that is substantially perpendicular to a direction along which the sorbent-laden structures 140 extend. In other examples, the first manifold structure 172 may be generally hollow.

The second manifold structure 174 is attached with respect to the second end 144 of the sorbent-laden structures 140. In one possible example, the second manifold structure 174 is attached to the support structures 150 by welding, adhesives, mechanical locking structures, or the like. The second manifold structure 174 can have a length that extends across each of the support structures 150 of the sorbent-laden structures 140. In an example, the second manifold structure 174 is generally solid and extends generally linearly in a direction that is substantially perpendicular to a direction along which the sorbent-laden structures 140 extend. In other examples, the second manifold structure 174 may be generally hollow.

The second sorption arrangement 130 can include the heating device 80. The heating device 80 is again illustrated generically/schematically, as it is to be appreciated that the heating device 80 includes any number of designs, configurations, etc. In one possible example, the heating device 80 can be attached with respect to the support structure 150 through one of the manifold structures (e.g., first manifold structure 172 or second manifold structure 174). The heating device 80 is generally identical to the heating device 80 described above with respect to FIG. 2, and need not be described in detail again.

Referring to FIGS. 4 and 5, the operation of the second sorption arrangement 130 can be described. The second sorption arrangement 130 can be positioned within the inlet system 10 either upstream or downstream from the filters 24. In either example, the second sorption arrangement 130 is positioned within the flow path of the inlet air 12. The filters 24 can filter/remove any number of materials and/or contaminants from the inlet air 12, including solid particulates, liquid particulates, or the like.

The inlet air 12, which includes the gas phase contaminants 13, can flow past the second sorption arrangement 130. As the inlet air 12 flows past the sorbent-laden structures 140, active deposits (e.g., sorbents) of the sorbent-laden media 60 can adsorb at least some of the gas phase contaminants 13. Adsorbed contaminants 13*a* can accumulate on the surface of the sorbent-laden structures 140 (e.g., on the sorbent-laden media 60). As such, the inlet air 12 can flow past the second sorption arrangement 130 with a reduced amount of gas phase contaminants 13 present within the inlet air 12.

After a period of time, a saturation level of gas phase contaminants 13*a* adsorbed by the sorbent-laden structures 140 may be reached, such that further adsorption of gas phase contaminants 13 by the sorbent-laden structures 140 is reduced. As such, a regeneration process can occur to allow for the second sorption arrangement 130 to continue adsorption of the gas phase contaminants 13. During the regeneration process, the heating device 80 can pass electric current to the support structure 150, which causes the support structure 150 and, thus, the sorbent-laden media 60 to heat up.

Due, at least in part, to this heating, adsorbed contaminants 13*a* on the sorbent-laden media 60 are released. In one possible example, to assist in the regeneration and off-gassing, an on-line water wash (e.g., with water supply devices such as nozzles) can be provided. In such an example, water is introduced to the sorbent-laden media 60 to remove the adsorbed contaminants 13*a*. The water, combined with the adsorbed contaminants 13*a*, can dilute the negative impact that the gas phase contaminants 13 may have on the gas turbine 36. In some examples, a compressor water wash can be triggered on the gas turbine 36 to reduce corrosion, such as corrosion of the compressor.

Figure 6:
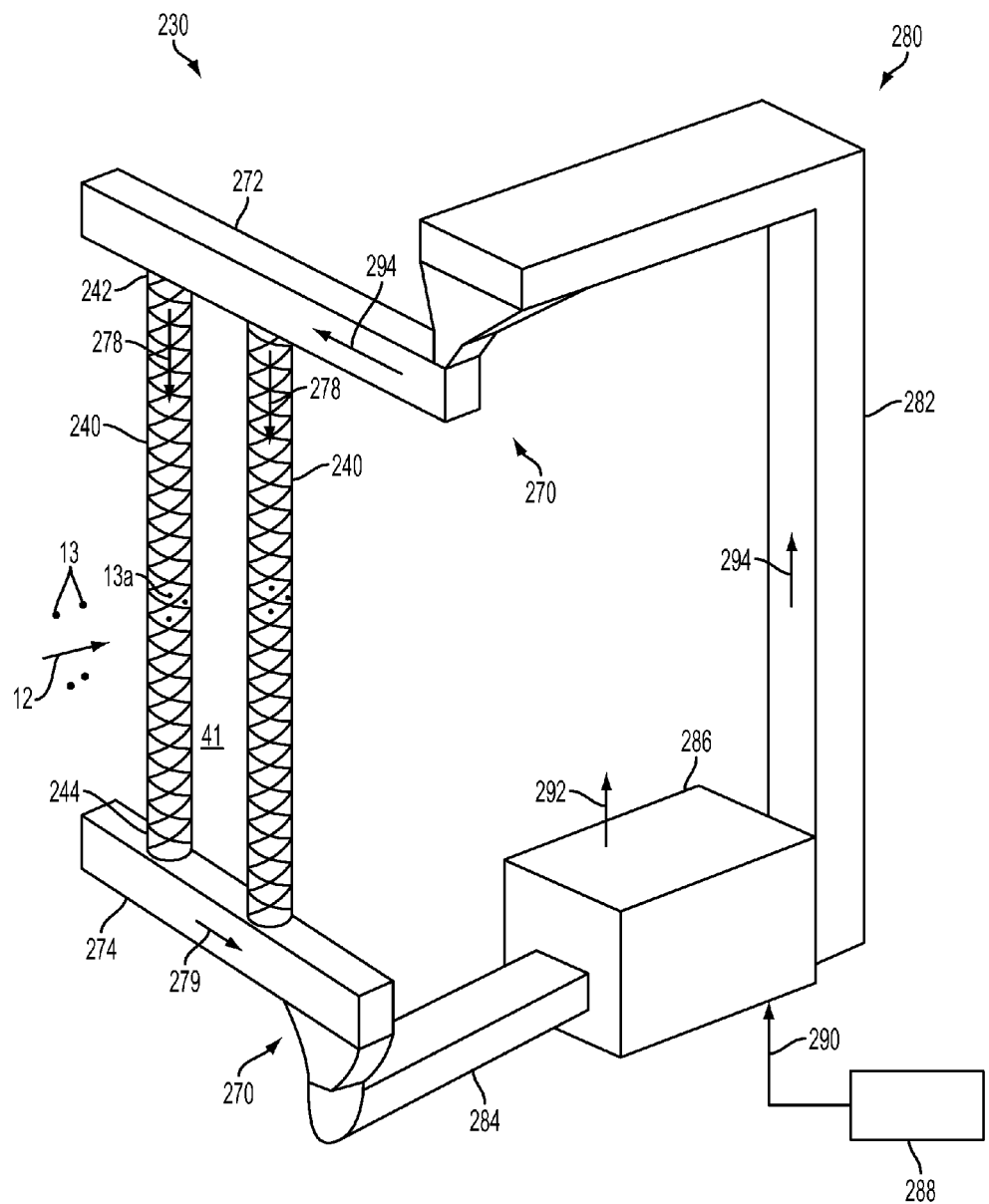
FIG. 6 is a perspective view of a third example sorption arrangement including an example regeneration device for use in the inlet system of FIG. 1.

Turning now to FIG. 6, a third example sorption arrangement 230 is illustrated. It will be appreciated that the third sorption arrangement 230 includes only one of any number of possible designs, constructions, etc. The third sorption arrangement 230 of FIG. 6 can be positioned within the filter section 20 of the inlet system 10 for the gas turbine 36.

The third sorption arrangement 230 can include one or more sorbent-laden structures 240. In the illustrated example, the third sorption arrangement 230 includes two sorbent-laden structures 240, though, in other examples, any number of sorbent-laden structures 240 are envisioned. As with the example of FIGS. 2 and 4, the sorbent-laden structures 240 are spaced apart to define openings 41 extending between adjacent sorbent-laden structures 240. Likewise, as with the example of FIGS. 2 and 4, while the sorbent-laden structures 240 are illustrated as being elongated, generally cylindrically shaped structures that extend linearly between a first end 242 and an opposing second end 244, any number of sizes (e.g., longer or shorter), shapes (e.g., polygonal shapes, quadrilateral shapes, rectangular shapes, circular shapes, ovoid shapes, etc.) and/or configurations (e.g., extending non-linearly with one or more bends, undulations, angles, etc.) are envisioned.

In this example, the sorbent-laden structures 240 of the third sorption arrangement 230 are generally identical with respect to the sorbent-laden structures 40 of FIGS. 2 and 3. For example, the sorbent-laden structures 240 may include the support structure 50 that is substantially hollow and at least partially porous. In this example, the sorbent-laden structures 240 include the openings 52, support wall 54, hollow interior 56, and sorbent-laden media 60 (each illustrated in FIG. 3). As such, the sorbent-laden structures 240 need not be described in detail again.

The third sorption arrangement 230 can include a manifold 270. In some examples, the manifold 270 can support the sorbent-laden structures 240, including the support structures 50, the sorbent-laden media 60, etc. The manifold 270 can include a first manifold structure 272 and a second manifold structure 274.

The first manifold structure 272 is attached with respect to the first end 242 of the sorbent-laden structures 240 while the second manifold structure 274 is attached with respect to the second end 244 of the sorbent-laden structures 240. The first and second manifold structures 272, 274 are attached in any number of ways to the sorbent-laden structures 240, including by welding, adhesives, mechanical locking structures, or the like. In this example, the first manifold structure 272 is generally identical to the first manifold structure 72 illustrated in FIG. 2. Likewise, the second manifold structure 274 is generally identical to the second manifold structure 74 illustrated in FIG. 2. Indeed, each of the manifold structures 272, 274 are generally hollow and extend linearly in a direction that is substantially perpendicular to a direction along which the sorbent-laden structures 240 extend.

The third sorption arrangement 230 can include a regeneration device 280. The regeneration device 280 can be attached with respect to the first manifold structure 272 and second manifold structure 274 of the manifold 270. In an example, the regeneration device 280 can include a first conduit 282 and a second conduit 284. The first conduit 282 defines a tube, channel, duct, or other enclosed structure through which fluid can flow. An end of the first conduit 282 can be attached to the first manifold structure 272 such that the first conduit 282 and first manifold structure 272 are in fluid communication. The second conduit 284 defines a tube, channel, duct, or other enclosed structure through which fluid can flow. In this example, an end of the second conduit 284 can be attached to the second manifold structure 274 such that the second conduit 284 and the second manifold structure 274 are in fluid communication.

The regeneration device 280 can include a blower 286. The blower 286 can be attached to the first conduit 282 and the second conduit 284. In an example, the blower 286 can be attached to an end of the first conduit 282 that is opposite the first manifold structure 272. Likewise, the blower 286 can be attached to an end of the second conduit 284 that is opposite the second manifold structure 274. The blower is illustrated somewhat generically/schematically, as it will be appreciated that the blower includes any number of air propelling structures, such as fans, air movers, negative pressure machines, etc. The blower 286, through the first conduit 282 and second conduit 284, is in fluid communication with the hollow interior of the manifold structures 272, 274 and the hollow interior 56 of the sorbent-laden structures 240.

The regeneration device 280 can include a sorbent supply 288 that is operatively attached to the blower 286. In an example, the sorbent supply 288 can deliver sorbents (e.g., sorbent-laden gas, desiccant(s), etc.) to the blower 286. The sorbent supply 288 is illustrated generically/schematically as the sorbent supply 288 includes any number of sizes, shapes, and constructions. Indeed, though not depicted in FIG. 6 for ease of illustration, the sorbent supply 288 can include one or more tubes, pipes, conduits, or the like. It is to be appreciated that sorbent delivery 290 from the sorbent supply 288 to the blower 286 is illustrated generically/schematically, as the sorbent delivery 290 may be delivered through the tubes, pipes, conduits, etc. In some possible examples, the sorbent supply 288 can include a liquid sorbent to transfer adsorbed gas.

In operation, the third sorption arrangement 230 is positioned within the inlet system 10 either upstream or downstream from the filters 24. In either example, the third sorption arrangement 230 is positioned within the flow path of the inlet air 12 so as to remove at least some of the gas phase contaminants 13. In a similar manner as described above with respect to FIG. 2, the inlet air 12 can flow past the third sorption arrangement 230 and to the gas turbine 36, with a reduced amount of gas phase contaminants 13 present within the inlet air 12.

After a period of time, a saturation level of gas phase contaminants 13a adsorbed by the sorbent-laden structures 240 may be reached, such that further adsorption of gas phase contaminants 13 is reduced. As such, a regeneration process can occur to allow for the third sorption arrangement 230 to continue adsorption of the gas phase contaminants 13. During the regeneration process, the blower 286 can receive the sorbents (e.g., sorbent-laden gas, desiccant(s), etc.) from the sorbent supply 288 in the form of the sorbent delivery 290. The blower 286 can move air to create a sorbent-laden air flow 294 through the first conduit 282 and to the first manifold structure 272.

This sorbent-laden air flow 294 can flow from the first manifold structure 272 and through the hollow interior 56 of the support structure 50 of the sorbent-laden structures 240. In some examples, this air flow (illustrated generically/schematically with arrowheads as air flow 278) through the hollow interior 56 can flow from the hollow interior 56, through the openings 52 (illustrated in FIG. 3) and to the sorbent-laden media 60. As such, due to the sorbent supply 288 delivering sorbents to the blower 286, these sorbents can flow to the sorbent-laden media 60 to at least partially regenerate the sorbent-laden media 60.

Air can continue to flow through the sorbent-laden structures 240, whereupon the air (illustrated generically schematically with arrowheads as air flow 279) exits the sorbent-laden structures 240 and enters the second manifold structure 274. In an example, this air flow 279 may have a smaller percentage of sorbents (e.g., sorbent-laden gas, desiccant(s), etc.) due, in part, to the sorbents having flowed to the sorbent-laden media 60. The air flow 279 can move from the second manifold structure 274, through the second conduit 284, and to the blower 286. In at least one example, this air flow 279 can exit the blower 286 as off gas 292.

This regeneration process can last nearly any amount of time that is necessary to at least partially regenerate the sorbent-laden structures 240. In some examples, the regeneration process illustrated in FIG. 6 can last approximately 5 to 10 minutes. Once the sorbent-laden structures 240 are regenerated, the blower 286 may be turned off, and adsorption of the gas phase contaminants 13 from the inlet air 12 may commence. Though not illustrated in FIG. 6, it is to be appreciated that in at least one example, the third sorption arrangement may include a heating device (e.g., heating device 80) to assist in the regeneration process.

The sorption arrangements 30, 130, 230 of FIGS. 1 to 6 provide a number of benefits. For example, the sorption arrangements 30, 130, 230 can be used to remove gas phase contaminants 13 from inlet air 12 that passes through the inlet system 10. As such, a quantity of gas phase contaminants 13 that flows to the gas turbine 36 is reduced, such that gas turbine performance is improved while reducing corrosion. Additionally, the sorption arrangements 30, 130, 230 have at least some degree of regeneration, such that the inlet system 10 and/or gas turbine 36 need not be turned off or idled during the regeneration process, thus improving performance.

Figure 7:
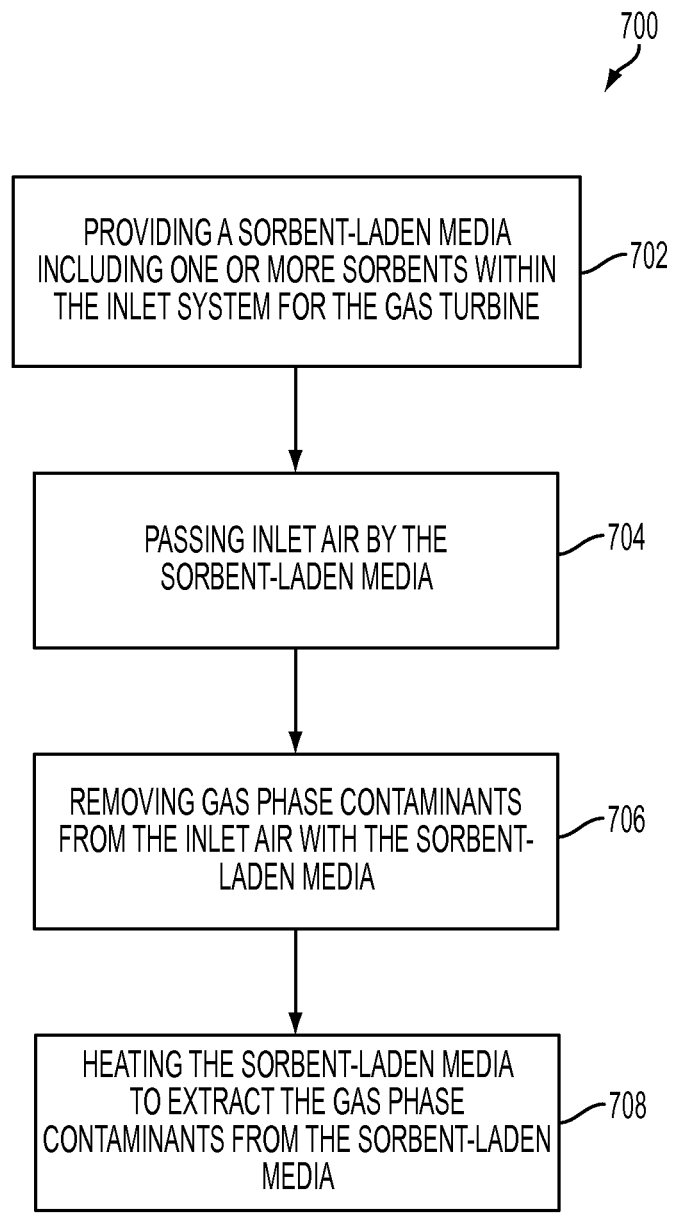
FIG. 7 is a flowchart depicting a method of removing gas phase contaminants within the inlet system of the gas turbine with the sorption arrangement.

Turning now to FIG. 7, an example method 700 of removing the gas phase contaminants 13 within the inlet system 10 of the gas turbine 36 is illustrated. The method 700 can be performed in association with the sorption arrangement 30, second sorption arrangement 130, and/or third sorption arrangement 230 illustrated in FIGS. 1 to 6.

The method 700 includes a step 702 of providing the sorbent-laden media 60 including one or more sorbents within the inlet system 10 for the gas turbine 36. As illustrated in FIG. 1, the sorption arrangement 30, 130, 230, which includes the sorption-laden media 60 (e.g., illustrated in FIGS. 2 to 6), can be positioned within the filter section 20. The sorption arrangement 30, 130, 230 can be provided upstream and/or downstream from the air filters 24a, 24b.

The method 700 includes a step 704 of passing the inlet air 12 by the sorbent-laden media 60. As illustrated in FIGS. 2, 4 and 6, the sorption arrangements 30, 130, 230 include sorbent-laden structures 40, 140, 240. The sorbent-laden media 60 forms the outer surface of the sorbent-laden structures 40, 140, 240. As such, the inlet air 12, including the gas phase contaminants 13, can pass by the sorbent-laden media 60.

The method 700 includes a step 706 of removing the gas phase contaminants 13 from the inlet air 12 with the sorbent-laden media 60. As illustrated in FIGS. 2, 4 and 6, the gas phase contaminants 13 can flow past the sorbent-laden media 60 of the sorbent-laden structures 40, 140, 240. As the gas phase contaminants 13 come into contact with the sorbent-laden media 60, at least some of the gas phase contaminants 13 are adsorbed (e.g., adsorbed contaminants 13a) on the surface of the sorbent-laden media 60. As such, the adsorbed contaminants 13a are removed from the inlet air 12.

The method 700 includes a step 708 of heating the sorbent-laden media 60 to extract the gas phase contaminants 13a from the sorbent-laden media 60. As illustrated in FIGS. 2 and 4, the sorption arrangements 30, 130 can include the heating device 80. The heating device 80 can heat the support structure 50 and, thus, the sorbent-laden media 60. The heating device 80 can heat the sorbent-laden media 60 in any number of ways, such as by Joule heating, by providing high temperature air to the sorbent-laden media 60, or the like.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A sorption arrangement for a gas turbine, the sorption arrangement including:
   an inlet system for the gas turbine, the inlet system including a substantially hollow chamber;
   a support structure positioned within the substantially hollow chamber, the support structure including an exterior surface configured to contact inlet air passing through the substantially hollow chamber of the inlet system; and
   a sorbent-laden media positioned on the support structure, the sorbent-laden media including one or more sorbents, wherein the support structure defines a substantially hollow interior with one or more openings extending through the support structure between the hollow interior of the support structure and the sorbent-laden media,
   wherein the sorbent-laden media is configured to contact inlet air passing through the substantially hollow chamber of the inlet system for the gas turbine such that gas phase contaminants are removed from the inlet air by the sorbent-laden media.

2. The sorption arrangement of claim 1, further including a second support structure positioned within the substantially hollow chamber, the second support structure including a second exterior surface to contact the inlet air passing through the substantially hollow chamber of the inlet system and the sorbent-laden media positioned on the second support structure.

3. The sorption arrangement of claim 1, further including a blower attached with respect to the hollow interior of the support structure, the blower configured to move air and create a negative pressure within the hollow interior.

4. The sorption arrangement of claim 3, wherein the blower is configured to deliver sorbent-laden air flow through the hollow interior of the support structure to the sorbent-laden media.

5. The sorption arrangement of claim 1, further including a heating device attached with respect to the support structure.

6. The sorption arrangement of claim 5, wherein the heating device is configured to heat the support structure by Joule heating.

7. The sorption arrangement of claim 5, wherein the heating device includes high temperature air from the gas turbine.

8. A sorption arrangement for a gas turbine, the sorption arrangement including:
   an inlet system for the gas turbine, the inlet system includes a substantially hollow chamber;
   a support structure positioned within the substantially hollow chamber, the support structure including an exterior surface, wherein the support structure defines a substantially hollow interior with one or more openings extending through the support structure between the hollow interior of the support structure and the sorbent-laden media;
   a heating device attached with respect to the support structure and configured to heat the support structure; and
   a sorbent-laden media supported by the support structure, the sorbent-laden media including one or more sorbents, wherein the sorbent-laden media is configured to contact inlet air passing through the inlet system for the gas turbine such that gas phase contaminants are removed from the inlet air by the sorbent-laden media.

9. The sorption arrangement of claim 8, further including a blower attached with respect to the hollow interior of the support structure, the blower configured to move air and create a negative pressure within the hollow interior.

10. The sorption arrangement of claim 9, wherein the blower is configured to remove sorbent-laden air flow through the hollow interior of the support structure to the sorbent-laden media.

11. The sorption arrangement of claim 8, wherein the heating device is configured to heat the support structure by Joule heating.

12. The sorption arrangement of claim 8, wherein the heating device is configured to heat the support structure using high temperature air from the gas turbine.

13. A method of removing gas phase contaminants within an inlet system of a gas turbine, the method including the steps of:
   providing an inlet system for the gas turbine, the inlet system comprising:
      a substantially hollow chamber;
      a support structure positioned within the substantially hollow chamber, the support structure including an exterior surface configured to contact inlet air passing through the substantially hollow chamber of the inlet system; and
      a sorbent-laden media positioned on the support structure, the sorbent-laden media including one or more sorbents, wherein the support structure defines a substantially hollow interior with one or more openings extending through the support structure between the hollow interior of the support structure and the sorbent-laden media,
      wherein the sorbent-laden media is configured to contact inlet air passing through the substantially hollow chamber of the inlet system for the gas turbine such that gas phase contaminants are removed from the inlet air by the sorbent-laden media;
   passing inlet air by the sorbent-laden media;
   removing gas phase contaminants from the inlet air with the sorbent-laden media; and
   heating the sorbent-laden media to extract the gas phase contaminants from the sorbent-laden media.

14. The method of claim 13, further including the step of: creating a negative pressure within the hollow interior of the support structure to extract the gas phase contaminants from the sorbent-laden media and through the support structure to the hollow interior.

15. The method of claim 14, wherein the heating the sorbent-laden media includes Joule heating the support structure.

16. The method of claim 13, further including the step of delivering sorbent-laden air flow to the sorbent-laden media.

* * * * *

UNITED STATES PATENT AND TRADEMARK OFFICE
CERTIFICATE OF CORRECTION

PATENT NO. : 9,492,780 B2
APPLICATION NO. : 14/156504
DATED : November 15, 2016
INVENTOR(S) : Robert Warren Taylor et al.

Page 1 of 1

It is certified that error appears in the above-identified patent and that said Letters Patent is hereby corrected as shown below:

In the Claims

Column 13, Lines 35-37, Claim 2, should read: a second support structure positioned within the substantially hollow chamber, the second support structure including a second exterior surface configured to contact the inlet air passing Column 13, Lines 46-47, Claim 4, should read: blower is configured to remove sorbent-laden air flow through the hollow interior of the support structure from the Column 13, Lines 56-57, Claim 7, should read: heating device is configured to heat the support structure using high temperature air from the gas turbine.

Column 13, Line 61, Claim 8, should read: including a substantially hollow chamber;

Column 14, Line 19, Claim 10, should read: through the hollow interior of the support structure from the Signed and Sealed this
Eighteenth Day of April, 2017

Michelle K. Lee
*Director of the United States Patent and Trademark Office*